Nov. 17, 1936.                D. FERGUSSON                2,061,229
                            VEHICLE TREAD CHAIN
                             Filed May 5, 1932
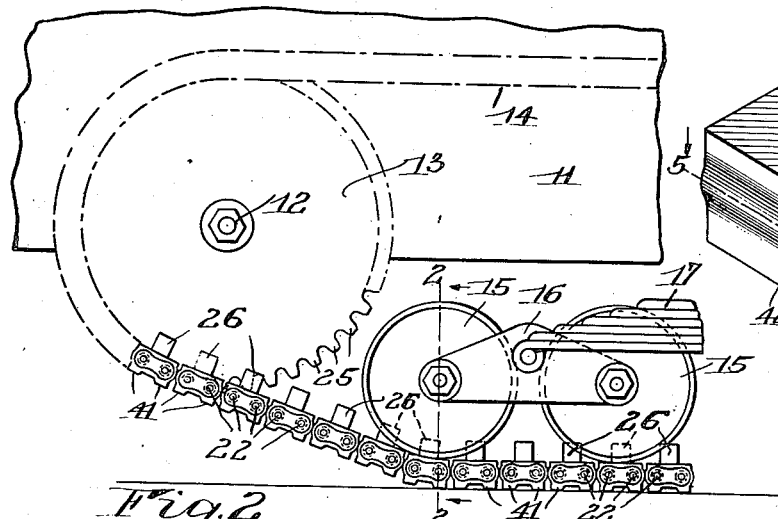
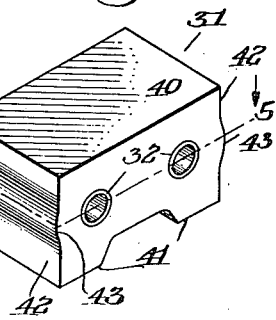
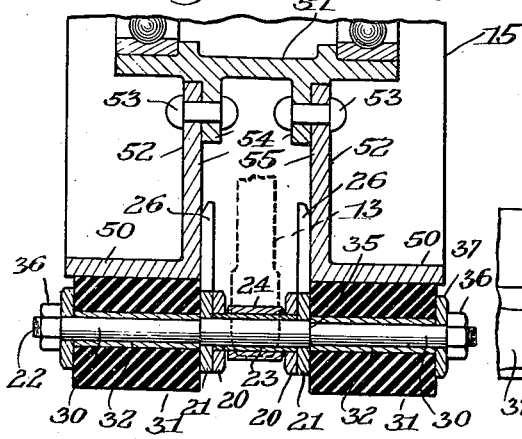
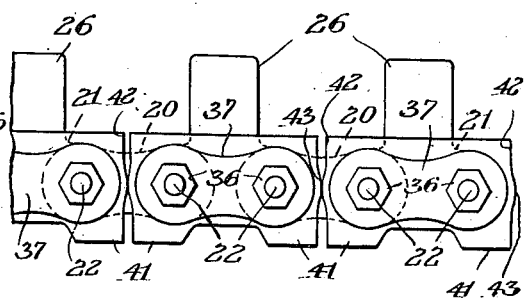
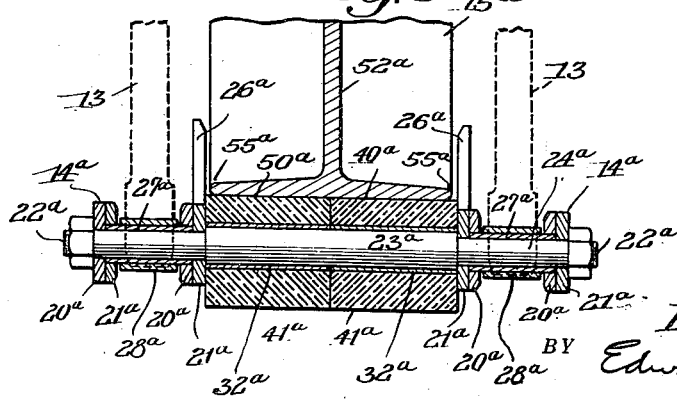
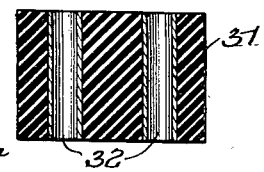
INVENTOR
David Fergusson
BY Edward H. Cumpston
his ATTORNEY Patented Nov. 17, 1936

2,061,229

UNITED STATES PATENT OFFICE 2,061,229

VEHICLE TREAD CHAIN

David Fergusson, Rochester, N. Y., assignor to James Cunningham, Son & Company, Rochester, N. Y., a corporation of New York Application May 5, 1932, Serial No. 609,387

9 Claims. (Cl. 305—10)

This invention relates to vehicle tread chains of the endless type. One object of the invention is the provision of an improved and more satisfactory chain of this class.

Another object is the provision of a link belt having pivotally connected links and provided with resilient cushioning members arranged to afford a cushioning support between the belt and both the vehicle and the ground so as to supply full cushioning support for the vehicle.

Still another object of the invention is the provision of such cushioning means arranged to be mounted on the pivot pins of the belt and adapted to form a cushion between the belt and the bearing surfaces of the vehicle and between the belt and the ground.

A further object is the provision of such cushioning means which is simple in construction, inexpensive to manufacture, and satisfactory in use.

To these and other ends the invention resides in certain improvements and combinations of parts, all as will be hereinafter more fully described, the novel features being pointed out in the claims at the end of the specification.

In the drawing:

Fig. 1 is a side elevational view of a vehicle equipped with an endless chain constructed in accordance with one embodiment of the invention;

Fig. 2 is a vertical sectional view taken substantially on the line 2—2 of Fig. 1 showing one form of guide roll and chain construction;

Fig. 3 is a fragmentary view of the chain illustrated in Fig. 1, on a larger scale, showing the arrangement of the various parts thereof;

Fig. 4 is a perspective view of one form of cushioning block constructed in accordance with the present invention;

Fig. 5 is a horizontal sectional view taken transversely of the block substantially on the line 5—5 of Fig. 4, and Fig. 6 is a view similar to Fig. 2 showing another form of guide roll and chain construction.

The same reference numerals throughout the several views indicate the same parts.

This invention is embodied, in the present instance by way of illustration, in a pivoted link belt to which are secured, in a manner hereinafter described, suitable cushioning blocks arranged to provide a cushion between the belt and the bearing surfaces of the vehicle and between the belt and the ground so that the weight of the vehicle is carried entirely by the blocks.

Referring now to the drawing, Fig. 1 shows a portion of a vehicle body 11 having a drive shaft 12 on which is mounted a drive sprocket 13, of any known or suitable construction, arranged to drive the chain 14. Guide rolls 15, two of which are shown in Fig. 1, are pivotally and rotatably mounted on the member 16 secured to one end of the leaf spring 17 on which the vehicle 11 is mounted. The rolls are arranged to support the chain 14 at the point of contact with the ground, as is well known in the art.

The chain 14 comprises a linked roller belt having overlapping links 20 and 21 pivotally connected together by pivot pins or bolts 22. The center portions of the pivot pins, intermediate the links, are provided with bushings 23 on which are mounted the rollers 24 with which the teeth 25 of the sprocket 13 engage. The bushings 23 may, however, be eliminated if desired, in which case the rollers 24 will be mounted directly on the center portions of the pins 22. The outer links 21 of the belt are provided with upwardly extending members or wings 26 arranged to engage guide surfaces on the rolls 15, as hereinafter described, to hold the chain against lateral movement relative to the rolls.

In the embodiment illustrated in Fig. 2, the pivot pins 22 are provided with portions 30 of reduced diameter extending outwardly from either side of the belt, and arranged to carry resilient cushioning blocks 31 disposed on opposite sides of the belt and extending above and below the links 20 and 21, as clearly illustrated in Fig. 2. Each of these blocks is made of rubber, or other analogous substance, referred to in general in this application as "rubber-like material", vulcanized on steel bushings 32, and is preferably long enough to be mounted on the two adjacent pivot pins, as shown in Fig. 3. The bushings 32 provide openings through which the portions 30 of the adjacent pins 22 extend, and serve as bearings for the blocks on the pins. The inner ends of the busings 32 abut shoulders 35 formed on the pins 22, and are held thereagainst by nuts 36 which engage threaded portions of the pins 22. A washer 37, of the shape best shown in Fig. 3, extends substantially the full length of the outer face of each of the blocks 31, and is disposed intermediate the block and the nuts 36 to provide bearings for the latter, as is clearly shown in Figs. 2 and 3.

Each block 31 is of the shape best shown in Fig. 4, and is provided with a substantially flat top 40 arranged to engage a bearing surface of the vehicle, as hereafter described, and a bottom formed with one or more grousers or feet 41 arranged to be held against the ground by the rolls 15, in the manner to be later pointed out. The ends 42 of the blocks are preferably spaced slightly from the ends of the adjacent blocks, and are provided with protruding curved portions 43 arranged to engage corresponding shaped portions on the adjacent blocks, as clearly illustrated in Fig. 3. By means of the portions 43, a line contact is provided between the adjacent blocks so that the blocks may readily move relative to each other in passing over drive sprocket 13.

The entire weight of the vehicle 11 is preferably carried on the rubber blocks 31. To this end, each of the rolls 15 is formed with a pair of circumferential faces or bearing surfaces 50 disposed on opposite sides of the linked belt and arranged to engage the tops 40 of the blocks 31, as clearly illustrated in Fig. 2. Each of these bearing surfaces is connected to the hub 51 of the roll 15 by means of spaced webs 52 secured to the hub 51 in any suitable manner, as for example, by rivets 53 which extend through the webs 52 and ribs 54 formed integral with the hub 51, as shown in Fig. 2. By means of this arrangement, the bearing surfaces 50 of the rolls 15 rest on and are supported entirely by the rubber blocks, the tops 40 of the latter providing a runway for the rolls.

In chains of this class, it is desirable to provide means for holding the chains against lateral movement, especially the parts of the chains which are in contact with the ground. It has been found that the webs 52 are admirably adapted for this purpose. To secure this desirable result, the webs 52 are so positioned that the inner faces 55 thereof are spaced a distance substantially equal to the width of the linked belt, and provide radial guide surfaces adapted to be engaged by the wings 26 to hold the chain against movement relative to the rolls 15.

Referring now to Fig. 2, it is apparent that the blocks 31 not only support the entire weight of the vehicle, but also provide a resilient cushioning support between the link belt and the bearing surfaces 50 and between the belt and the ground. Such a construction gives quiet operation, except for the mere contact of the metal belt with the sprocket teeth as in any chain drive, combined with the strength afforded by the metal link belt. The metal belt parts are of standard commercial construction, except for the lengthened pivot pins, and may be obtained in any desired size and dimensions and at a reasonably low cost.

Fig. 6 shows a modified tread chain comprising spaced roller link belts 14a, each having overlapping links 20a and 21a. The inner group of links 21a on each belt is provided with upwardly extending members or wings 26a arranged to engage guide surfaces on rolls 15a, one of which is shown in Fig. 6, to hold the chain against lateral movement, as hereafter pointed out. Pivot pins or bolts 22a extend between the two belts 14a and are provided with a central or intermediate portion 23a arranged to hold the belts in proper spaced relation, and reduced end portions 24a arranged to pivotally connect the links 20a and 21a of each belt, as will be clearly understood from an inspection of Fig. 6. Each end portion 24a is provided with a bushing 27a which extends between the outer links 21a and which provides a bearing for the roller 28a. If desired, the bushings 27a may be eliminated in which case the rollers 28a will be mounted on the reduced end portions 24a.

One or more, in the present instance two, rubber cushioning blocks 41a are positioned on the intermediate portions 23a of the pins 22a and are arranged to extend above and below the belts 14a, as clearly shown in Fig. 6. These blocks are similar to the one shown in Fig. 3, and heretofore described, except that the bushings 32a are slightly larger than the bushings 32, so as to fit on the larger intermediate portion 23a. In this case also the blocks are preferably made long enough to be mounted on the two adjacent pivot pins, as heretofore pointed out. While this embodiment shows two blocks 41a mounted on the pivot pins 22a, this is by way of illustration only, as it is contemplated that a single block of a width equal to the distance between the belts may be used, if desired. The blocks 41a may cooperate with the enlarged intermediate portion 23a of the pins 22a to retain the belts 14a in proper spaced relation.

Each of the guide rollers 15a, only one of which is shown, is formed with a circumferential flange or bearing surface 50a connected by a thin web 52a to the hub, not shown, of the roller. This flange is arranged to rest on and to be supported by the upper surface 40a of the block, and holds the bottom 41a thereof in contact with the ground, the top 40a providing a runway for the flange 50a of the roll 15a. The block 41a thus supports the weight of the vehicle and also provides a cushion between the belts and the bearing surfaces 50a and between the belts and the ground, thus assuring substantially quiet operation. While the face of the flange 50a is arranged to engage the block 41a to hold the latter in engagement with the ground, the edges 55a thereof provide radial guide surfaces with which the wings 26a are arranged to engage to hold the tread chain against lateral movement relative to the chains.

It is apparent from the above description that the present invention provides a tread chain which, although constructed of a strong metal link belt, is so arranged as to provide a rubber cushion between the belt and the bearing surfaces of the vehicle, and between the belt and the ground so that the weight of the vehicle is carried entirely by the rubber blocks, thus assuring quiet operation. As the rubber blocks and their supporting pins are the only special parts, and as the blocks may be readily molded, the whole chain construction is also comparatively inexpensive.

Chains so constructed afford the tractive strength and durability of a pivoted metal link belt, and at the same time the quiet and full cushioning action between the vehicle supporting surfaces and the ground of a belt having a rubber surface on each side. The present invention thus provides a novel way of combining the advantageous features of different kinds of belts not heretofore found in a single belt.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention and the scope of the appended claims.

I claim:

1. A vehicle track comprising two series of blocks spaced laterally from each other and each series extending longitudinally substantially parallel to the other, each block having a hole near its front end and a hole near its rear end, a series of transversely extending members, one extending laterally into each hole of each block of one series and into a hole in one block of the other series, and metallic means connecting each transversely extending member to another transversely extending member cooperating with a different block of the same series, the space between the blocks of one series and the blocks of the other series being sufficient so that a driving sprocket may enter said space for cooperation with said transversely extending members, said blocks each having ground engaging lower surfaces of resilient material throughout substantially their entire ground engaging areas, and each having a substantially flat upper surface of resilient material, said upper surface of each block extending relatively close to the upper surfaces of the next adjacent blocks of the same series, to provide a substantially smooth and continuous trackway over which a vehicle supporting wheel may roll.

2. A vehicle track comprising two series of blocks spaced laterally from each other and each series extending longitudinally substantially parallel to the other, each block having a hole near its front end and a hole near its rear end, a series of transversely extending members, one extending laterally into each hole of each block of one series and into a hole in one block of the other series, metallic means connecting certain of said transversely extending members to each other, and upstanding guiding lugs on certain of said connecting means, the space between the blocks of one series and the blocks of the other series being sufficient so that a driving sprocket may enter said space for cooperation with said transversely extending members, said blocks each having a resilient ground engaging lower surface and a resilient upper surface extending relatively close to the upper surfaces of the next adjacent blocks of the same series to provide a substantially smooth and continuous trackway over which a vehicle supporting wheel may roll.

3. A vehicle track chain comprising two longitudinally extending rows of blocks of rubber-like material, the blocks of both rows having upper surfaces substantially flat in a longitudinal direction to provide a substantially smooth trackway over which a wheel may roll, and having lower surfaces provided with downwardly-extending integral lugs, each of said blocks having two transversely extending holes therein, a series of transversely extending pins, each passing through one hole in a block in one row and through one hole in a block in the other row, each pin projecting at both ends beyond the edges of the blocks through which it passes, link means connecting each pin passing through one block in one row to a pin passing through a different block in the same row, the bottom edges of said link means being above the bottom edges of said blocks, and a series of metallic plates mounted on said pins, each plate lying against one side of one of said blocks and encircling the two pins which extend through that block.

4. A vehicle track chain comprising a longitudinally extending row of track blocks, two pin means extending transversely into each track block, and link means connecting each pin means of each track block to one pin means of an adjacent block, each track block having its greatest length approximately at the level of said pin means and being of slightly reduced length both above and below the level of said pin means to provide clearance space between adjacent blocks so that said blocks may oscillate relatively to each other, the upper surface of each block being of resilient rubber-like material to provide a substantially continuous smooth trackway over which a vehicle wheel may roll, the lower ground-engaging surface of each block having extreme ground-engaging corners separated from each other by a distance approximately equal to the length of said upper surface and materially greater than the center to center distance between the two pin means extending into the block.

5. A vehicle track chain comprising a longitudinally extending row of track blocks, two pin means extending transversely into each track block, and metallic link means connecting each pin means of each track block to one pin means of an adjacent block, each track block having its greatest length approximately at the level of said pin means and being of reduced length both above and below the level of said pin means, the clearance space between adjacent blocks at their upper and lower surfaces being relatively small and being substantially just sufficient so that said blocks may oscillate relatively to each other to a reasonable degree, the upper surface of each block being of resilient rubber-like material to provide a substantially continuous smooth trackway over which a vehicle wheel may roll, the bottom ground-engaging surface of each track block being below the bottom surfaces of said pin means and link means, said bottom surface of each block being recessed intermediate its length and having on opposite sides of the recess two ground-engaging portions having extreme ground-engaging corners separated from each other by a distance materially greater than the center to center distance between the two pin means extending into the block.

6. A vehicle track construction comprising means forming a continuous articulated chain, said chain means including transverse pins and link means connecting the pins to each other in a continuous series, said link means including parts spaced laterally from each other to provide space between them for receiving teeth of a sprocket over which said chain is adapted to run, said pins projecting a material distance laterally outwardly beyond said link means at both sides thereof, one longitudinal series of tread blocks mounted on said projecting pins on one side of the link means, and a second longitudinal series of tread blocks mounted on said projecting pins on the opposite side of the link means, each block of each series being mounted on two different pins and each block having a lower ground-engaging surface of rubber-like material at an elevation below the lowermost part of said chain means, so that said tread blocks support said chain means out of contact with the ground, each block also having a substantially flat upper surface of rubber-like material extending relatively close to the upper surfaces of the adjacent blocks of the same series, the upper surfaces of all the blocks collectively forming a substantially continuous trackway over which a vehicle supporting wheel may roll smoothly.

7. A vehicle track construction comprising means forming a continuous articulated chain, said chain means including transverse pins and link means connecting the pins to each other in a continuous series, said link means including parts spaced laterally from each other to provide space between them for receiving teeth of a sprocket over which said chain is adapted to run, said pins projecting a material distance laterally outwardly beyond said link means at least at one side thereof, and two longitudinal series of tread blocks mounted on said projecting pins, each block of each series being mounted on two different pins and each block having a lower ground-engaging surface of rubber-like material at an elevation below the lowermost part of said chain means, so that said tread blocks support said chain means out of contact with the ground, each block also having a substantially flat upper surface of rubber-like material extending relatively close to the upper surfaces of the adjacent blocks of the same series, the upper surfaces of all of the blocks collectively forming a substantially continuous trackway over which a vehicle supporting wheel may roll smoothly.

8. A vehicle track chain comprising a longitudinally extending row of track blocks, two pin means extending transversely into each track block, and link means connecting each pin means of each track block to one pin means of an adjacent block, each track block having its greatest length approximately at the level of said pin means and being of slightly reduced length both above and below the level of said pin means to provide clearance space between adjacent blocks so that said blocks may oscillate relatively to each other, the upper surfaces of the blocks collectively providing a trackway over which a vehicle wheel may roll, the lower ground-engaging surface of each block having lower front and rear corners separated from each other by a distance approximately equal to the length of the upper surface of the block and greater than the center to center distance between the two pin means extending into the block.

9. A vehicle track chain according to claim 8, in which said lower surface of each block is recessed intermediate said front and rear corners.

DAVID FERGUSSON.